Patented July 19, 1938

2,123,949

UNITED STATES PATENT OFFICE 2,123,949

FLUX FOR GALVANIZING

Raymond J. Kepfer, Lakewood, Ohio, assignor to E. I. du Pont de Nemours & Company, Wilmington, Del., a corporation of Delaware No Drawing. Original application November 14, 1934, Serial No. 752,943. Divided and this application June 10, 1937, Serial No. 147,473

2 Claims. (Cl. 148—25)

This invention relates to flux compositions and processes for hot dip galvanizing, and is particularly directed to prepared flux compositions and to processes wherein cotton-seed meal is used as a foaming agent.

In hot dip galvanizing, a bath of molten zinc is covered with a flux. As articles to be galvanized are lowered into the molten zinc bath, they, of course, first pass through the flux where they are cleaned and prepared for the reception of a metal coating.

It has heretofore been the practice to add a material such as glycerine or tallow to the flux on the molten bath, in order to produce a foam or froth. This foam serves to entrap vapors and gases, and to retard the rate of volatilization of the flux. In the course of a galvanizing operation, it has been necessary to replace such of the flux as has volatilized, and it has also been necessary to add foam producing material to maintain a foam blanket of the desired thickness and character.

A considerable loss of flux and of foam producing agent resulted from the fact that they were added separately, and at the judgment of the galvanizer. At times there was not enough of the foaming agent present to maintain a foam of proper consistency and thickness, with the result that an excessive amount of flux was lost by volatilization.

At other times, and especially immediately following its addition, there was present an excess of poorly mixed foaming material, with the result that some of it was decomposed and charred by the high temperatures of the galvanizing pot. In addition to thus wasting foaming agent, this decomposition and charring resulted in the formation of charred particles which interfere with galvanizing operation.

It is an object of this invention to provide processes and compositions whereby an optimum foam thickness and consistency are easily maintained, and whereby there is a minimum loss of flux and foaming agent. A further object of my invention is to provide a prepared composition which may be conveniently and easily used. Other objects will appear hereinafter.

I accomplish my objects by mixing together the proper amounts of a flux and a protein containing material. A galvanizer is thus enabled to add the flux and foaming agent conveniently and in the proportions required to obtain a desired height and consistency of foam. As a result, there is no excessive loss of flux by volatilization. Also, since the flux and foaming agent are intimately mixed and in proper proportions, there is no charring of foaming agent.

The compositions of my invention are composed of cotton-seed meal and a chloride flux selected from the group consisting of zinc chloride, ammonium chloride, and zinc ammonium chloride.

While I usually employ from about one to five per cent of cotton-seed meal, the amount may be varied according to the conditions of use. When the composition is to be used in a basket-process, or in a process of similar type, it is desirable to maintain a thick, heavy foam. Compositions to be used with such processes should contain about three per cent or more of cotton-seed meal.

However, in the so-called hook process in which articles are suspended from hooks when lowered into the bath, it is necessary to use a somewhat lighter and thinner foam as otherwise the articles will not penetrate the foam, but will float off the hooks and become detached. For this type of process the flux composition preferably contains from about one to three per cent of cotton-seed meal.

As typical examples of compositions according to my invention, I may give the following:

Example I

A prepared flux particularly adapted for use in a basket-type galvanizing process was prepared by intimately mixing three per cent of cotton-seed meal with a zinc ammonium chloride flux (44% $ZnCl_2$ and 56% $NH_4Cl$). This composition was used by adding some of it directly to a galvanizing pot containing molten zinc. An excellent foam blanket which lasted thirty-six minutes and which was about five inches thick was obtained. It was easily maintained by adding more of the composition as needed.

Example II

A similar flux composition was prepared using five per cent of cotton-seed meal. A foam seven inches thick which lasted about thirty-nine minutes was obtained.

Example III

A flux composition particularly adapted for use in a hook-type galvanizing process was prepared by intimately mixing one and one-half per cent of cotton-seed meal with a zinc ammonium chloride flux. With this prepared composition, a foam about three and one-half inches thick was obtained. The foam lasted about thirty minutes, and it was then necessary to add more of the prepared composition to maintain the foam. The foam was of a relatively thin consistency, and when articles suspended from hooks were lowered into the bath they penetrated the foam without floating off the hooks.

*Example IV*

A composition similar to that of Example III was prepared using two per cent of cotton-seed meal. A foam which lasted about thirty-five minutes and which was about four inches thick was obtained.

Cotton-seed meal as a foaming agent may be mixed with the flux in any desired manner. For instance, the cotton-seed meal in finely divided form may be tumbled or ground with the flux to prepare a compounded mixture suitable for addition directly to a galvanizing bath.

While the invention, as above described, is particularly adapted to hot dip galvanizing, it may be applied to processes of hot dip coating which use molten baths of tin, lead, or cadmium.

While I have disclosed certain specific compositions and processes, they are merely illustrative and I do not intend to be limited thereby, the scope of my invention appearing from the following claims.

This application is a division of application Serial No. 752,943, filed November 14, 1934.

I claim:

1. As a new article of manufacture, a foaming galvanizing flux composition for use on a galvanizing bath of molten metal comprising a predetermined amount of cotton-seed meal and a chloride flux selected from the group consisting of zinc chloride, ammonium chloride, and zinc ammonium chloride.

2. In a process of hot dip galvanizing wherein articles to be coated are immersed in a bath of molten zinc, the steps comprising adding directly to the bath a foaming flux comprising a predetermined amount of cotton-seed meal and a chloride flux selected from the group consisting of zinc chloride, ammonium chloride, and zinc ammonium chloride, and maintaining a desired foam character and thickness by directly adding more of the foaming flux as required.

RAYMOND J. KEPFER.